Dec. 30, 1958   R. M. SOMERS   2,866,647
DICTATING MACHINE
Filed April 10, 1953   5 Sheets-Sheet 1

INVENTOR
Richard M. Somers
BY
George H. Fritzinger
Att.

Dec. 30, 1958   R. M. SOMERS   2,866,647
DICTATING MACHINE
Filed April 10, 1953   5 Sheets-Sheet 2

Fig. 2

INVENTOR
Richard M. Somers
BY George H. Fritzinger
Agt.

Dec. 30, 1958  R. M. SOMERS  2,866,647
DICTATING MACHINE

Filed April 10, 1953  5 Sheets-Sheet 3

INVENTOR
Richard M. Somers
BY
George H. Fritzinger
Att.

Dec. 30, 1958  R. M. SOMERS  2,866,647
DICTATING MACHINE
Filed April 10, 1953  5 Sheets-Sheet 4

INVENTOR
Richard M. Somers
BY
George H. Fritzinger
Ast.

Dec. 30, 1958 R. M. SOMERS 2,866,647
DICTATING MACHINE

Filed April 10, 1953 5 Sheets-Sheet 5

INVENTOR
Richard M. Somers
BY George H. Fritzinger
Agt.

United States Patent Office 2,866,647
Patented Dec. 30, 1958

2,866,647

DICTATING MACHINE

Richard M. Somers, West Orange, N. J., assignor, by mesne assignments, to McGraw-Edison Company, Elgin, Ill., a corporation of Delaware Application April 10, 1953, Serial No. 347,875

5 Claims. (Cl. 274—13)

This invention relates to improvements in dictating machines adapted for recording and reproducing dictation and is herein described in connection with such machine for recording on and reproducing from disc records, but no unnecessary limitation of the invention to disc-record machines is intended.

Objects of the invention are to provide new and improved mechanisms for selectively conditioning such machines for recording and reproducing, for advancing and returning the carriage (for the translating means) progressively through its path of travel, and for backspacing the carriage by step action when it is desired to listen back to selected portions of a recordation.

Another object is to provide a multifunction control member for both conditioning and carriage-movement control of the machine, which control member has both translational and rotational control-effecting movements.

More specifically, it is an object to provide a multifunction control knob normally positioned within the general contour of the machine for controlling the machine during the recordation of dictation, which control knob is movable outwardly for controlling the machine for reproducing.

Another object is to provide a control means operable by such control knob as the same is turned when in record position for conditioning the machine for limited reproduction of the last portion of one's recordation.

Another object is to provide a control mechanism operable by turning movement of such control knob when in reproduce position for moving the carriage progressively in advance and return directions.

Another object is to provide an index carriage having a positive one-way coupling to the carriage for the translating devices, which coupling is directed to prevent backspacing of the latter carriage by manual movement of the index carriage.

Another object is to provide a master switch control means adapted also for locking the translating means out of engagement with the record, such locking means being for the purpose of protecting the translating means while the machine is being carried or otherwise transported.

Another object is to provide an improved warning means for indicating when operation is nearing the end of the record.

A still further object is to provide improved circuits for control and signal devices of dictating machines.

In the description of my invention reference is had to the accompanying drawings, of which:

Figure 3 is a partial top plan view of the dictating machine mechanism as seen with the top section of the housing removed;

Figure 1:
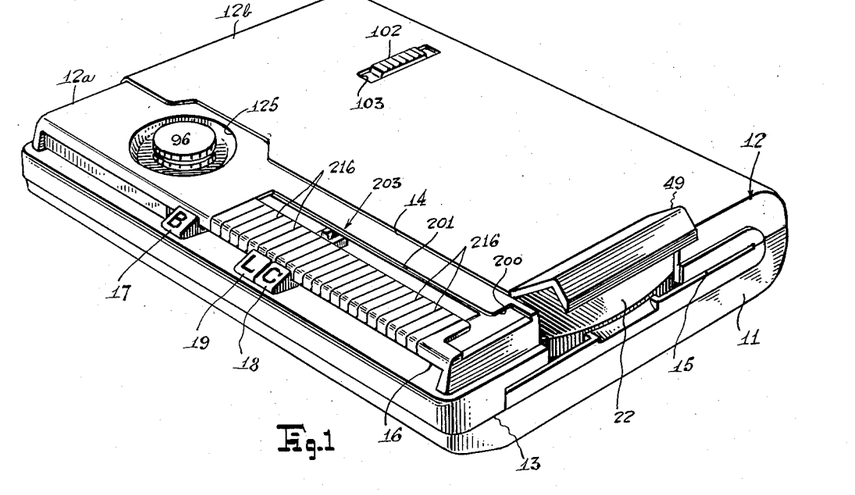
Figure 1 is a perspective view of a dictating machine embodying my invention.
Figures 2, 2A:
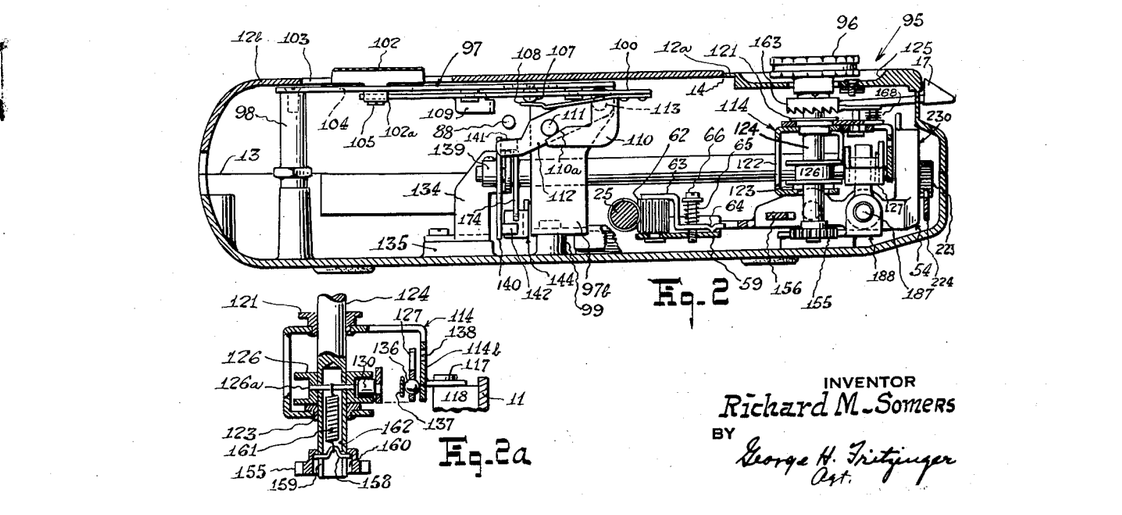
Figure 2 is a vertical view with parts in section on the line 2—2 of Figure 3.
Figure 2A is a detailed sectional view to larger scale of a portion of the apparatus shown in Figure 2, taken also on the line 2—2 of Figure 3.
Figure 2:
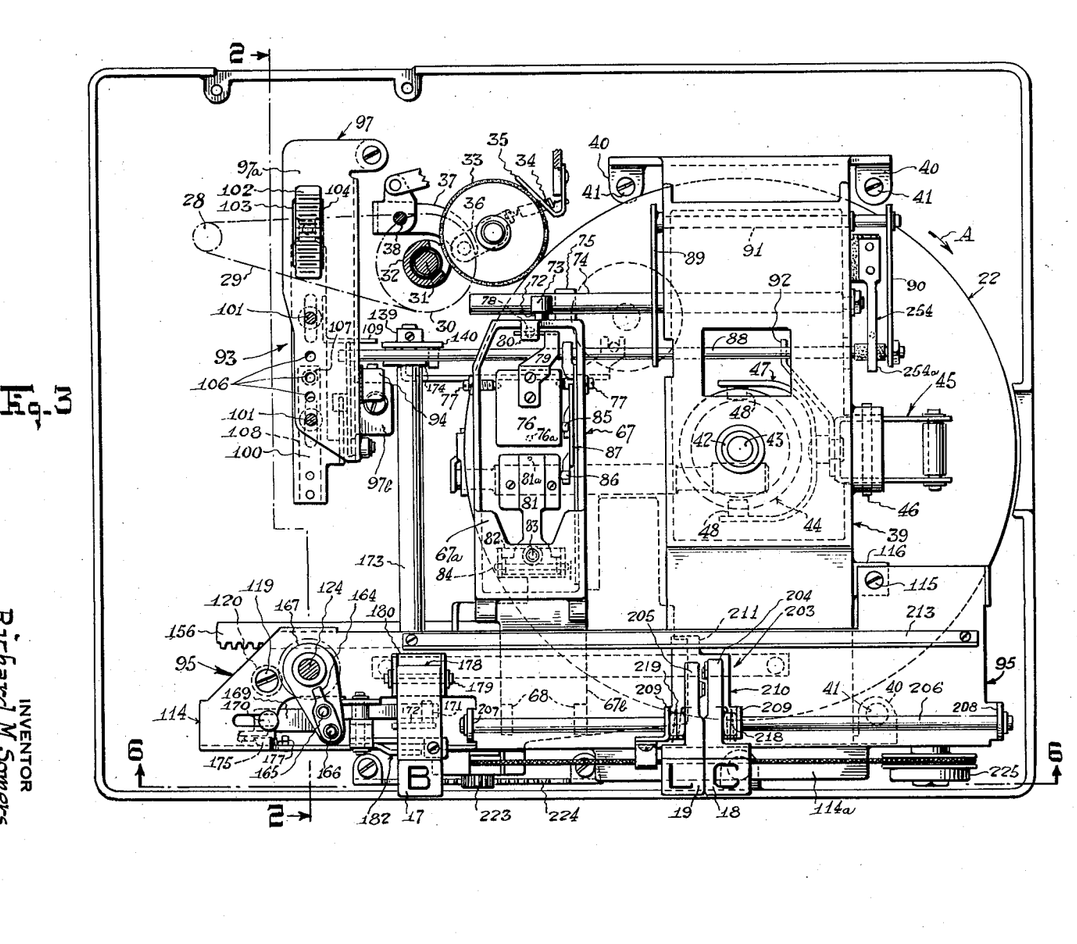

By way of preferred design, the present dictating machine has a housing comprising relatively-flat lower and upper pan-shaped housing sections 11 and 12 which are rectangular as viewed from the top and which meet mainly on a medial plane shown by the line 13 in Figure 2. The lower section is of one-piece construction but the upper section comprises front and rear members 12a and 12b which meet at the break line 14 shown in Figures 1 and 2. The housing sections are secured together by screws (not shown) to form a structure which is substantially closed except for a long horizontal slot 15 in the right side of the housing for insertion and removal of disc records into and from the machine, and a long opening 16 (Figures 1 and 8) in the forward right-half portion of the machine constituting a clearance opening for a back-spacing key 17 and for traveling indexing keys 18 and 19.

Figure 4:
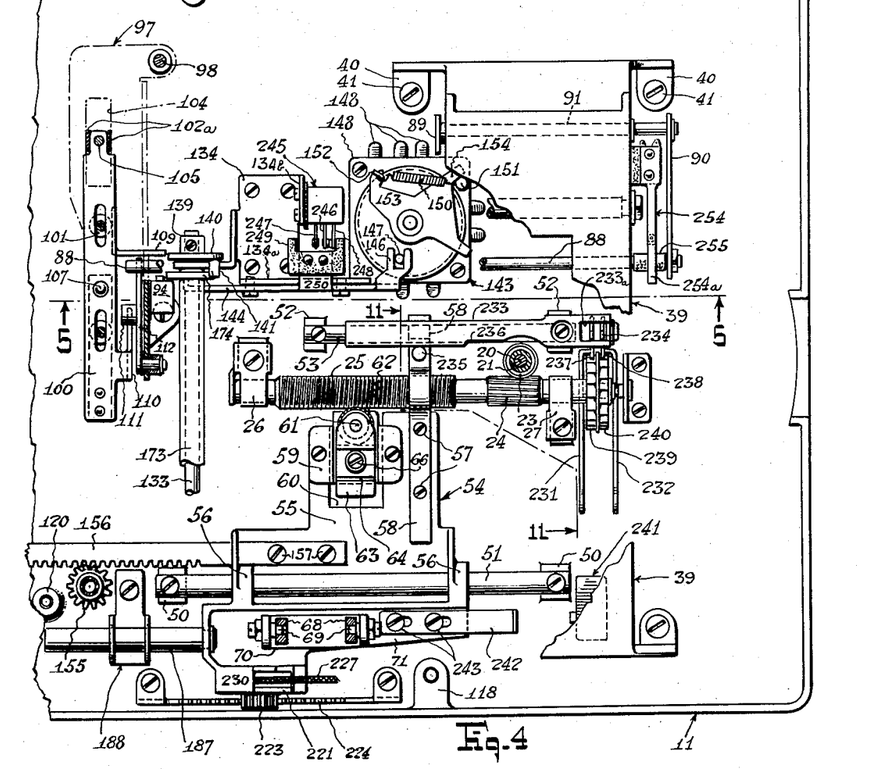
Figure 4 is a top plan view of a righthand portion of the mechanism shown in Figure 3 but with parts broken away.
Figure 16:
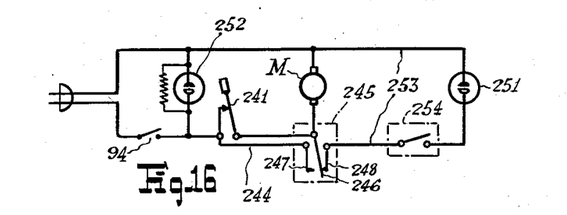
Figure 16 is a schematic drawing of circuits and mechanism of the machine.

The lower housing section—which serves also as a frame for the machine—has an upstanding post 20 on which is journaled a tubular shaft 21 for a turntable 22 (Figures 4 and 3). The shaft carries a worm gear 23 which meshes with a worm wheel 24 on a feed screw 25 supported at its ends by bearings 26 and 27. The turntable is driven in the direction of arrow A (Figure 3) from a drive pulley 28 of a motor M (Figure 16). The drive pulley is coupled through a belt 29 to a drive wheel 30 having a driving spindle 31, journalled in a bearing 32, for engagement with a friction idler wheel 33 (Figure 3). The idler wheel 33 is urged by a tension spring 34 against the peripheral rim of the turntable and against a brake shoe 35 for braking the turntable against movement, but the idler is journalled to a link 36 which in turn is pivoted to a control lever 37 itself pivoted on a stud 38 so that by turning the control lever the idler is moved from the brake shoe along the peripheral rim of the turntable into frictional engagement with the driving spindle. This friction drive is described and claimed in the pending Dietz application Serial No. 319,825, filed November 12, 1952 (now Patent No. 2,753,026 dated July 3, 1956), to which reference may be had for a description as to details.

Overlying a central portion of the turnable is a front-to-back-extending bridge 39 having footlike end portions 40 seating on the lower housing section and secured thereto by screws 41. On this bridge axially in line with the turntable is an interior bearing 42 rotatably receiving a plunger rod 43 which carries a record-clamping member 44 at its lower end. The plunger rod is movable upwardly and downwardly by a transversely-extending U-shaped lever 45 which is pivoted to the right side of the bridge 39 on a cross pin 46. Secured to the inner end of this U-lever is a fork 47 having diametrically-opposite pins 48 which engage a peripherally-grooved portion of the record-clamping member. The U-lever is coupled to a door 49 hinged to the top section 12 of the housing. The door is openable as shown in Figure 1 to provide space for the fingers in mounting and removing a disk record onto and from the turntable, and the coupling between the door and the U-lever 45 is such that the record-clamping member is engaged and disengaged with and from the turnatable as the door is closed and opened. This record-clamping means need not be herein further described for the purposes of the present invention, but reference as to details thereof may be had to the pending Dietz application Serial No. 320,025, filed November 12, 1952, now Patent No. 2,793,864, dated May 28, 1957.

Figure 11:
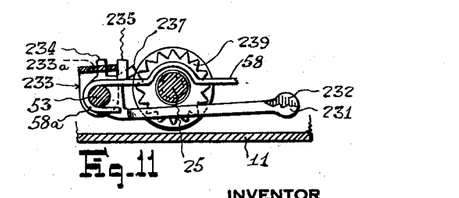
Figure 11 is a fractional sectional view taken substantially on the line 11—11 of Figure 4.

On the front portion of the lower housing section there is a pair of standards 50 supporting a front cross rod 51. Also, at the central portion of the lower housing section there is a second pair of standards 52 supporting a parallel cross rod 53 (Figure 4). Mounted slidably on these cross rods is a subcarriage 54. The subcarriage 54 comprises a casting 55 having apertured lugs 56 slidably embracing the cross rod 51. Secured by screws 57 to the rearward portion of the subcarriage is a bracket 58 which has a semicircular end portion 58a slidably embracing the rear cross rod 53 (Figure 11). Mounted on the subcarriage to the left of the bracket 58 is a bracket plate 59 having a central portion offset downwardly into an open-ended slot 60 in the subcarriage. Staked to this central portion of the bracket plate is a vertical stud pin 61 on which is journalled a circular feed nut 62 that meshes with the feed screw 25. Downward pressure is exerted on this circular feed nut by a lever 63 fulcrumed at 64 on the bracket plate and under force of a compression spring 65 interposed between a central portion of the lever and the head of an adjusting screw 66 that is threaded into the bracket plate, the adjusting screw passing through a central clearance opening in the lever as indicated in Figure 2. The pressure on the circular feed nut is set by adjustment of the screw 66 so that the feed screw is frictionally held sufficiently against rotation to cause the subcarriage to be driven upon rotation of the feed screw but insufficiently to prevent the carriage from being moved by hand through manual control means herein later described.

A main carriage 67 overlies the subcarriage and comprises a hollow rectangular casting 67a provided with a forward extension 67b (Figure 3). The extension 67b terminates in two downwardly-extending feet 68 which are apertured for pivotal engagement with trunnions 69 shown in Figure 4. These trunnions are threaded through the arms of an upstanding U-bracket 70 mounted on a front apron 71 of the subcarriage. Secured to the rearward end of the main carriage is a stud pin 72 on which there is journaled a roller 73 as shown in Figure 3. This roller rides on a horizontal cross rod 74 carried by and projecting leftwardly from the bridge 39. Thus, the main carriage rides on the rod 74 at its rearward end and is hinged to and propelled by the subcarriage at its forward end. A tab 75 projecting rearwardly from the main carriage below the cross rod 74 serves to prevent any substantial upward displacement of the main carriage.

A recorder 76 is mounted in the rearward portion of the main carriage on a pair of cone pivots 77 that are threaded through the side walls of the carriage. This recorder has a stylus 76a at its forward end for engaging a record mounted on the turntable. Biasing force to exert suitable pressure of the recording stylus against the record is provided partially by the weight of the recorder and partially by a tension spring 78 connected between a tailpiece 79 on the recorder and an overhanging tab 80 on the main carriage.

A reproducer 81 is mounted in the front portion of the main carriage with universal (lateral and vertical) freedom of movement. The universal mounting for the reproducer comprises a gimbal ring 82 pivoted to a top wall of the main carriage on a vertical pin 83, and a cross pin 84 carried by the gimbal ring and to which a tailpiece of the reproducer is pivoted. The reproducer has a stylus 81a at its rearward end for engaging the record under the influence of its own weight. In the normally centralized position of the reproducer, the stylus thereof engages the record at a short trailing distance behind the recorder with respect to the direction of advance of the carriage.

The recorder and reproducer have laterally-extending lift pins 85 and 86 at their free end portions by which they may be lifted from the record. The lifting is done through a lever mechanism 87 mounted on the right wall of the main carriage and operable by a lift rod 88 that extends parallel to the path of travel of the carriage. This lift rod is mounted for up-and-down movement on parellel arms 89 and 90 which are secured to a shaft 91 journaled in the bridge 39. The lever mechanism 87 is such that when the lift rod 88 is in a raised position, both the recorder and reproducer are withheld from the record; that when the lift rod is in an intermediate position only the reproducer engages the record; and that when the lift rod is in a lowered position both the recorder and reproducer engage the record. In the last position of the lift rod, however, the audio circuits are completed only with respect to the recorder as is hereinafter described. In view of these functions of the lift rod, its uppermost, intermediate and lowered positions are herein termed its "netural," "reproducing" and "recording" positions respectively. Since the present invention is not concerned specifically with the lever mechanism 87, the same need not be herein further described, but for further details thereof reference may be had to the pending Dietz application Serial No. 320,025 above-mentioned.

The lift rod is subject to several different control means each of which has only a one-way coupling thereto effective to raise or retain the lift rod in reproducing and neutral positions but ineffective to force lowering of the rod. Only when each of these control means is positioned to permit lowering of the lift rod will the latter move to lowered position and then it does so by its own weight and the downward biasing thereon transmitted from the reproducer and recorder through the lever mechanism 87. Firstly, the lift rod has a one-way coupling with the record-clamping mechanism effective to raise the lift rod to neutral position as the record-clamping mechanism is released and to permit, but not force, the lift rod to be lowered as the record-clamping mechanism is actuated. This one-way coupling comprises a side arm 92 on the record-clamp lever 45, the end portion of which arm underlies the lift rod to raise the same as the record-clamping mechanism is released, and vice versa. Secondly, the lift rod is coupled to operating means 93 for an on-off master switch 94 so that the lift rod may be locked in neutral position while the master switch is in "Off" position. Thirdly, upon release of the lift rod from neutral position by the record-clamping mechanism and master switch operating means, the same may be shifted between record and reproduce positions by a record-reproduce control mechanism 95 operable by a control knob 96. This control knob has a unique mode of operation to control still other functions according to my invention as will appear.

The master switch 94 for the machine—which controls power typically to the drive motor and/or amplifier—is preferably of the pushbutton type biased into "Off"—i. e., open—position and movable to "On" position as the pushbutton thereof is pressed inwardly. The switch is mounted on the right side of a bracket 97 which has a horizontal table-like top portion 97a secured at its rearward end to a post 98 on the lower housing section. At its forward portion the bracket has a depending leg 97b secured to a boss 99 on the lower housing section shown in Figure 2. On the under side of the top horizontal portion of this bracket is a manual slide 100 mounted by screw and slot means 101 for front and back movement. At the rear end of this slide there is a corrugated control button 102 projecting up through a clearance opening 103 in the upper housing section as shown in Figure 1. This control button has depending ears 102a passing through a clearance slot 104 of the bracket 97 in embracing relation to the slide, and has also a central pin 105 by which the button is staked to the slide as shown in Figures 3 and 4. The bracket has three holes 106 engageable successively by a ball 107 carried with the slide and under pressure of a cantilever spring 108. This spring-urged ball serves to detent the slide in three different positions referred to, from front to back, as the "On," "Off" and "Lock-up" positions respectively. Projecting from the right side of the slide is a finger 109 which abuts against the pushbutton of the switch 94 to operate the switch closed whenever the slide is moved into its foremost "On" position. Also, at the right side of the slide there is a depending right-angle arm 110 having a cam face 110a on the end portion thereof cooperable with an intermediate side pin 111 on a lever 112 pivoted at 113 to the bracket leg 97b. This lever is provided for raising the lift rod 88 into neutral position. When the slide is in its foremost and intermediate "Off" positions—the intermediate position thereof appearing in Figure 2—the lever 112 occupies a lowered position out of the path of movement of the lift rod 88; but as the slide is moved into its rearward "Lock-up" position the cam arm 110 engages the pin 111 and operates the lever 112 to raise the lift rod into neutral position. This rearward position of the operating slide 97 for the master switch is one for withholding the recorder and reproducer from the record as when the machine is to be carried from one place to another. The intermediate position of the slide is for shutting off power to the machine while leaving the recorder and reproducer styli in engagement with the record, such as is desirable during temporary periods of non-use of the machine.

The record-reproduce control mechanism 95 is mounted on the left end portion of a long bracket plate 114 extending the full length of the machine at the front thereof. This bracket plate is secured near its right end to a lug 116 on the bridge 39 by a screw 115 as shown in Figure 3, is supported at its central portion by a foot 114a at the lower end of a flange 114b extending along the front of the bracket plate, the foot being seated on and secured to a ledge 118 on the lower housing section by a screw 117 (Figures 6 and 15), and is secured at its left end by a screw 119 to a post 120 standing up from the lower housing section (Figures 3 and 4). The bracket plate 114 has a vertical bearing 121 at its left end, and has a right-angle lug 122 depending therefrom and carrying a second vertical bearing 123 in line with the first bearing (Figure 2A). These bearings support a shaft 124 for rotational and for vertical translational movement. Onto the upper end of this shaft there is secured the aforementioned control knob 96. When the shaft is in its downward position, hereinafter referred to as its "record" position, the control knob is disposed in a circular recess or well 125 of the upper housing member 12a. This well is substantially larger in diameter than the knob to provide easy access to the latter by the hand so that the knob can be raised into reproduce position as desired.

Figure 7:
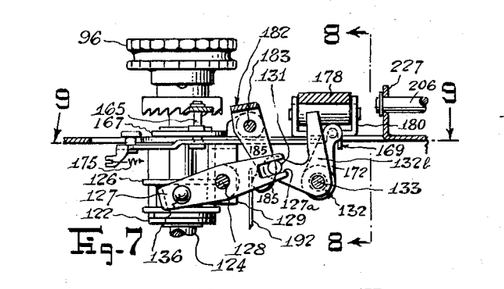
Figure 7 is a fractional elevational view of the mechanism shown in Figure 9 with parts in section on the line 7—7 of that figure.
Figure 9:
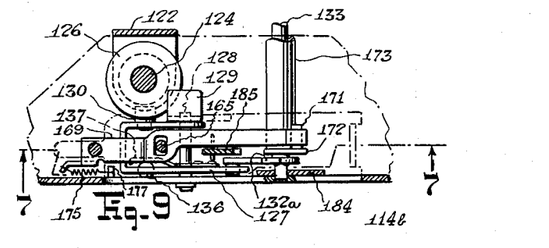
Figure 9 is a fractional section taken substantially on the line 9—9 of Figure 7.

Secured as by a pin 126a to the portion of the shaft 124 between the bearings 121 and 123 is a grooved wheel 126. Positioned forwardly of the machine from this grooved wheel is a bail 127 pivoted on a horizontal pin 128 supported at its forward end by the flange 114b and at its rearward end by a lug 129 welded to the bracket plate (Figures 7 and 9). Mounted on the back side of the bail is a roller 130 which engages the grooved wheel 126 to cause the bail to be rocked as the shaft 124 is raised and lowered. The bail has an arm extending rightwardly along the back side of the flange 114b. This arm terminates in a fork 127a which embraces a pin 131 on an arm 132a of a rocker 132. The rocker is secured to a front-to-back-extending shaft 133 journaled at its forward end in the flange 114b (Figure 9) and at its rearward end in a bracket 134 secured to a boss 135 on the lower housing section. This coupling of the bail 127 to the shaft 133 is such as to cause the latter to be turned counterclockwise, as viewed in Figure 7, as the knob 96 is raised from record to reproduce position. A detent is provided for releasably retaining the control mechanism in reproduce position, which comprises a ball 136 carried in a clearance opening in the front leg of the bail 127 and urged forwardly against the back side of the flange 114b by a cantilever spring 137 on the bail (Figure 9). The ball registers with an opening 138 in the flange 114b when the control knob is in reproduce position for detenting the knob in this position.

Figure 5:
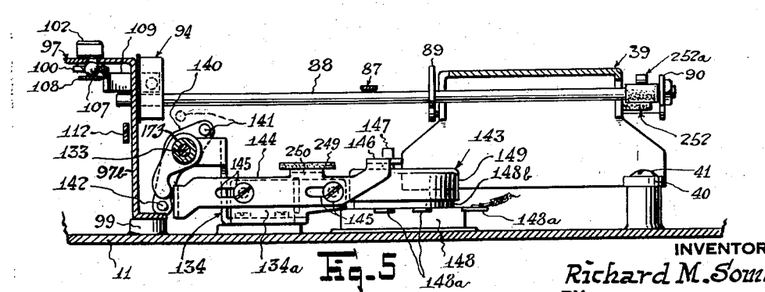
Figure 5 is a fractional sectional view taken on the line 5—5 of Figure 4.

Secured to the rearward end of the shaft 133 is the hub 139 of a lever 140 having an upwardly-extending arm carrying a cross pin 141 (Figures 4 and 5) which underlies the lift rod 88 (Figure 2). When the control knob 96 is in record position, the pin 141 occupies a lower position shown in Figure 5 to permit full downward movement of the lift rod to record position as when the record-clamping mechanism is actuated to clamp a record on the turntable and the switch button 102 is in its "On" or "Off" position. However, as the control knob 96 is raised to reproduce position the pin 141 is moved to an upper position dottedly indicated in Figure 5, which is a position permitting lowering of the lift rod only to reproduce position.

The lever 140 has also a downwardly-extending arm carrying a cross pin 142 for operating an amplifier-reversing switch 143, through a slide 144, as the control knob 96 is raised to reproduce position. The slide is mounted by pin and slot means 145 on a vertical flange 134a of the bracket 134, and has a forked end portion 146 engaging a pin 147 standing up from the switch as shown in Figure 4. This switch—which is preferably of the character described in Dann Patent 2,280,143—is mounted on the lower housing section and has a base 148 from which projects a series of terminals 148a. Extending upwardly from the base is a cylindrical housing 148b and overlying this housing is a rotatable cup 149 to which the pin 147 is secured. The cup is urged clockwise, as it appears in Figure 4, into a switching position adapted for recording, by a tension spring 150 connected between a stationary pin 151 on the base 148 and a lug 152 of a plate 153 spot-welded to the top of the cup, this position being defined by abutment of an arm 154 of the plate 153 against the pin 151. In response to this biasing, the slide 144 is urged leftwardly into the position shown in Figure 5. However, as the control knob 96 is raised into reproduce position, the pin 142 of the lever 140 strikes the end of the slide and moves the slide rightwardly to place the amplifier switch 143 in reproduce position. Thus, raising the control knob 96 to reproduce position permits only the reproducer to engage the record and places the amplifier switch 143 in reproduce position to complete the audio circuits of the machine to the reproducer.

Secured to the lower end of the shaft 124 is a pinion wheel 155 for engagement with a rack 156 secured to the subcarriage 54 by screws 157 as shown in Figure 4. This rack extends leftwardly from the subcarriage in line with its direction of travel. However, it is only when the control knob 96 is raised into reproduce position that this engagement occurs. When the knob is in record position the pinion is below the rack and out of engagement therewith as shown in Figure 2. This pinion-rack arrangement enables the subcarriage 54, and the main carriage 67 secured thereto, to be moved forwardly and backwardly through their paths of travel by rotation of the control knob 96 when the knob is in its reproduce position. By such rotation the carriage can be shifted at will to backspaced or advanced positions. Typically, the carriage will be so moved by the control knob 96 to scan recorded areas for listening back to selected portions of one's dictation, for spacing the carriage ahead at the end of a dictation unit, and for returning the carriage to start position at the end of recordation of a record. These normal movements of the carriage are performed while the machine is conditioned for reproducing. However, if a record is not mounted on the turntable, the reproducer, as well as the recorder, are preferably held up in neutral position by a safe-guarding device controlled according to whether or not a record is clamped to the turntable. Such safeguarding device need not be herein shown and described but reference may be had to the aforementioned Dietz application Serial No. 320,025 for details thereof. The purpose of enabling the carriages to be shifted by the control knob 96 only when the machine is in neutral and reproduce conditions is to safeguard the user from accidentally placing the recorder onto a recorded area. The only reason for ever backspacing over a recorded area is for listening back to portions or to all of one's recorded dictation. By forcing the user to lift the recorder before such backspacing can be accomplished, the chances of accidental lowering of the recorder onto a recorded area of the record, with possible mutilation of the recording, are greatly diminished.

Since the control knob 96 is raised by hand, and since the teeth of the pinion 155 are likely to be out of alignment with those of the rack 156 as the knob is manually raised, it is desirable that there be vertical yieldability between the pinion and rack to prevent forcing the pinion against the rack as one endeavors to raise the knob. Such yieldability is provided by splining the pinion to the shaft 124 through the means of a cross pin 158 traversing diametrically-opposite open-ended slots 159 in the lower portion of the shaft and engaging internal diametrically-opposite grooves 160 in the pinion at its ends as shown in Figure 2A. A tension spring 161 disposed in a cylindrical recess 162 of the shaft 124 is connected between the cross pin 126a aforementioned and the pin 158 to hold the pinion yieldably in a raised position relative to the shaft, which position is defined by abutment of the cross pin 158 against the ends of the slots 159. Thus, if the teeth of the pinion strike against those of the rack as the knob is pulled upwardly, the spring 161 yields until the knob is subsequently turned to align the teeth whereupon the pinion is snapped upwardly into engagement with the rack.

Frequently, the requirement for listening back extends only past the last few words or sentence, to enable one to reconstruct the line of thoughts being dictated as after an interruption such as a telephone call. Such limited listening back to one's last portion of recordation is accomplished in the present machine simply by turning the knob 96 clockwise through a fraction of a turn while in record position. In so doing the audio circuits are shifted from the recorder to the reproducer while maintaining both the recorder and reproducer in engagement with the record but with the reproducer at a trailing distance behind the recorder as hereinbefore mentioned. While maintenance of the recorder on the record during such limited listening back to one's recordation will cause idle grooves to be formed ahead of the recorded area to the extent of the trailing distance between the recorder and the reproducer, it has the advantage of maintaining a progressive uninterrupted groove in the record which is beneficial in maintaining proper tracking during playback.

The means for shifting the circuit connections by turning the knob 96 comprises a ratchet wheel 163 on the shaft 124 engaged by a pawl 164 mounted loosely on two upright pins 165 and 166 standing up from an arm 167 that is pivoted on the bearing 121 (Figures 2, 3, 6 and 7). A compression spring 168 surrounding one of these pins and disposed between the arm and pawl serves to maintain the pawl yieldably in engagement with the ratchet wheel at all times while the knob 96 is in record position but not when the knob is raised into reproduce position. The innermost pin 165 of the two pins just mentioned projects below the arm 167 (Figure 7) into coupled relation to a horizontal connecting bar 169. The left end portion of this bar is slidably mounted on the bracket plate 114 by pin and slot means 170 and the right end thereof is bent half round for pivotal engagement with a pin 171 on an arm 172 secured to one end of a tubular shaft 173 embracing the shaft 133 (Figures 7-9). Secured to the rearward end of the tubular shaft is a depending arm 174 (Figure 4) which is disposed in line with a lug turned over from the end portion of the slide 144. The tubular shaft is held yieldably in clockwise position shown in the figures by a tension spring 175 connected between the bar 169 and a pin 177 on the bracket plate 114 as shown in Figure 9. Upon the control knob 96 being turned clockwise while in record position, the bar 169 is moved leftwardly by means of the ratchet wheel 163 and pawl 164 against the tensioning of the spring 175 to turn the tubular shaft counterclockwise as it appears in Figure 5. By such turning of the tubular shaft the arm 174 is moved against the slide 144 to shift the amplifier switch 143 into reproduce position. Upon release of the knob 96 while in record position the same is returned counterclockwise by the returning action of the spring 175 acting on the bar 169 and by the action of the spring 150 on the amplifier switch. As above described, however, this turning of the control knob while in record position does not backspace the carriage since the pinion 155 is now out of engagement with the rack 156.

Figure 6:
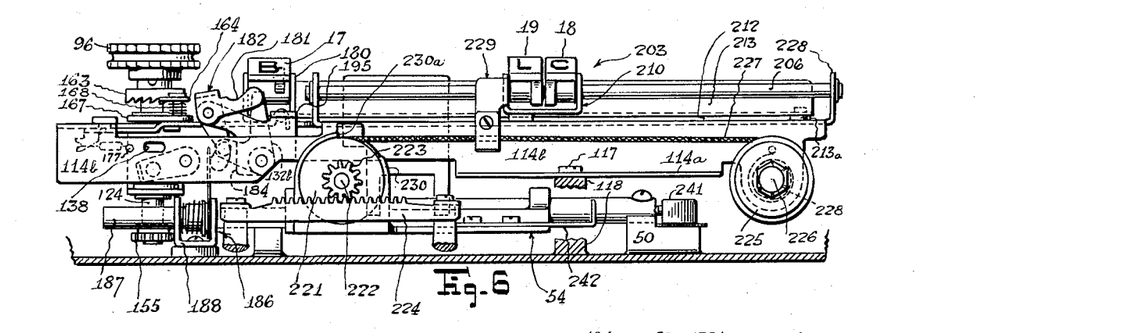
Figure 6 is a front sectional view taken on the line 6—6 of Figure 3.
Figure 8:
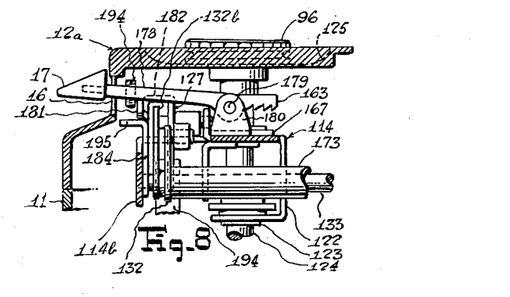
Figure 8 is a righthand elevation of mechanism indicated in Figure 7 with a part of the housing in section as it would appear from the line 8—8 of that figure.
Figure 10:
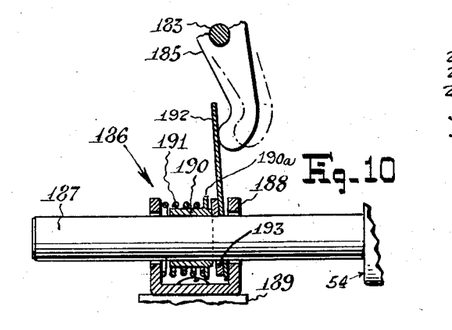
Figure 10 is an enlarged fractional view of the carriage backspacing mechanism with parts shown in section.

Backspacing of the carriage for the purpose of listening back to selected portions of a recordation is preferably carried out step by step, and for this purpose there is the backspacing key 17 mounted on a lever 178 hinged at 179 to a bracket 180 mounted on the bracket plate 114 as shown in Figures 3 and 8. This backspacing key extends forwardly through the front opening 16 of the housing. The backspacing key rests on an arm 181 of a bell crank 182 (Figure 6) which is pivoted on a pin 183 supported at one end by a lug struck upwardly from the bracket plate 114 (Figures 3 and 7) and at the other end by a supporting arm 184 spot-welded to the flange 114b of the bracket plate (Figures 6 and 8). The bell crank has a depending arm 185 (Figure 10) which operates against a friction-type ratchet, generally referred to as 186, for backspacing the subcarriage. The ratchet 186 operates on a rod 187 extending leftwardly from the subcarriage through clearance holes in a U-bracket 188 mounted on a boss 189 of the lower housing section. Loosely embracing the rod 187 between the arms of the U-bracket is a collar 190 having a peripheral flange 190a at its right end. Between this flange and the left arm of the U-bracket there is a compression spring 191 which urges the collar rightwardly. At the right end of this collar there is a hardened steel washer 193. This washer is movable with respect to the rod 187 but has very small clearance with respect thereto so that the washer will grip the rod firmly whenever pressure is exerted at one end thereof along the rod. Between this washer and the right arm of the U-bracket there is a pry 192 having a clearance hole through which the rod 187 extends. The pry extends upwardly to the front of the arm 185 of the bell crank and is operable leftwardly as the backspace key is depressed. When it is so operated it pivots against the right arm of the U-bracket about its lower end as a center and bears only against the uppermost part of the washer 193 to cock the washer relative to the rod 187 so that it will frictionally grip the rod. Further leftward movement of the pry after such grip occurs backspaces the carriage. When the backspace key is released the collar 190, washer 193 and pry 192 are moved rightwardly relative to the rod 187 by the spring 191 and, at the same time, the backspace key is raised to its unoperated position. Thus, upon recurrently depressing the backspace key the carriage is backspaced step by step. An adjustable stop is provided for the backspace key in the form of a screw 194 threaded through the backspace lever 178 in line with a stop lug 195 (Figure 8) on the support arm 184.

Since backspacing of the carriage by the backspace key 17 is undesirable when the machine is conditioned for recording, the lever 132 is provided with a second arm 132b (Figure 7) which, when the control knob 96 is in record position, is upstanding directly below the backspace lever 178 to block the backspace lever against being moved from its raised position. Upon raising the knob 96 to reproduce position, the bail 127 is turned clockwise to turn the lever 132 counterclockwise into a position wherein the blocking arm is out of the path of movement of the backspace lever.

By way of summary, it will be observed that the multifunction control knob 96 has the following control functions: (1) it has a lower record position for engaging the recorder with the record and connecting the amplifier circuits thereto while at the same time blocking the backspacing key, (2) it can be turned while in record position to shift the amplifier circuit to the reproducer while retaining the recorder on the record and maintaining the backspace key blocked, (3) it has an upper reproduce position for engaging only the reproducer with the record and connecting the amplifier circuits to the reproducer, while removing the block on the backspace key, and (4) it is coupled to the carriage when in reproduce position to enable the carriage to be moved back and forth, as desired, by rotation of the knob.

Figure 12:
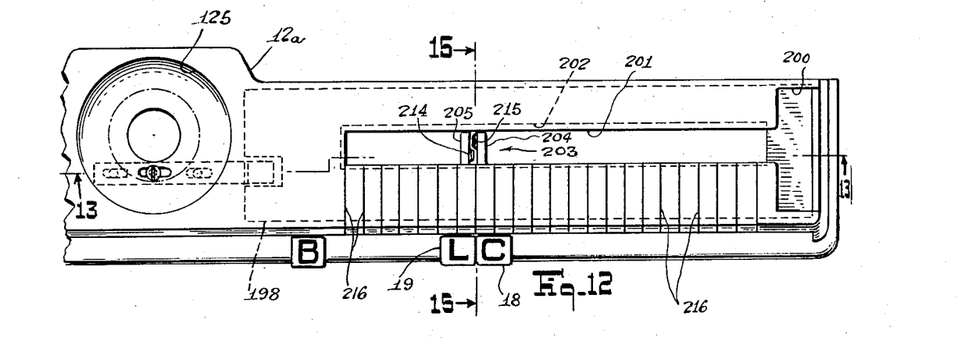
Figure 12 is a fractional plan view of a front member receiving the index slip, and of an associated index-punching mechanism.
Figure 13:
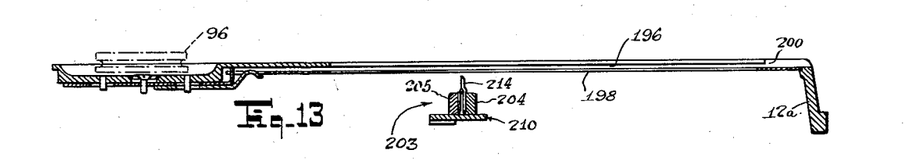
Figure 13 is a section on the line 13—13 of Figure 12 showing also the record-reproduce control knob in dash-dot lines.
Figure 14:
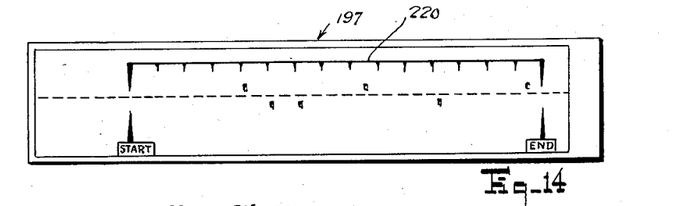
Figure 14 is a plan view of the index slip.
Figure 15:
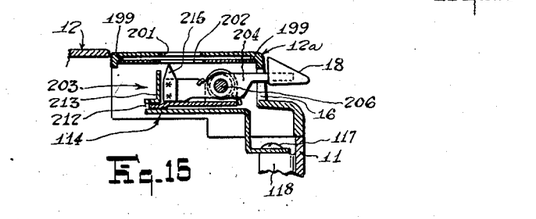
Figure 15 is a vertical section on the line 15—15 of Figure 12.

The upper housing member 12a has a long horizontal channel 196 open at the right end thereof and extending nearly to the well 125 for receiving an index slip 197 such as is shown in Figure 14. The channel 196 is defined by the top wall of the housing member and a bottom plate 198 positioned in spaced relation thereto against two shouldered flanges 199 as shown in Figure 15. The top wall has a recess 200 extending through the width of the channel at the open end thereof (Figure 12) so as to expose the right end portion of a mounted slip so that the slip may be gripped readily when it is to be removed. Also, the top wall has a slot 201 extending from the recess 200 throughout the operative length of the slip to expose a central band portion thereof, and similarly the bottom plate has a slot 202 to provide access to this central band portion of the slip from the bottom thereof for index punching means 203 herein next described.

The index-punching means 203 comprises two lever-type punches 204 and 205 mounted side by side on a support rod 206 carried by lugs 207 and 208 struck upwardly from the bracket plate 114 (Figure 3). These punches are confined side to side by being mounted between two apertured ears 209 of an indexing carriage 210, the ears being mounted slidably on the support rod 206 for movement of the index carriage along the rod. This carriage is restrained from tilting movement about the rod by engagement of a rear tab 211 thereof with a guideway 212 formed between the bracket plate 114 and a bar 213 secured in spaced relation thereto at its ends through spacers 213a shown in Figure 6. Mounted on the rearward ends of the lever punches 204 and 205 are pointed blades 214 and 215 respectively, and mounted on the forward ends of these levers are the keys 18 and 19 hereinbefore mentioned. The levers 204 and 205 are biased by torsion springs 218 and 219 respectively so that the blades are held normally in downmost positions defined by abutment of the rearward portions of the levers against the carriage 210. When the blades are in these downward positions they stand below the index slip. Upon pressing either of the keys 18 or 19 the respectively associated blade is moved upwardly to punch the slip. The punches are located in line with each other and with the break line between the indexing keys 18 and 19 so that the carriage can be positioned at any selected position where a punch mark was made by moving the same until this break line between the keys is aligned with the punch mark. In order to facilitate this aligning of the break line between the keys with a punch mark, a series of lines 216 are provided on the section of the housing member 12a which lies between the keys and the slot 201. Punch marks made by pressing the keys 18 and 19 are for indicating corrections and lengths respectively, and accordingly the key 18 is marked by the letter C and the key 19 by the letter L.

The index carriage 210 is moved throughout the length of the scale 220 on the index slip in direct proportion to the travel of the carriage for the translating devices, by a coupling comprising a drum 221 journaled on a horizontal pivot 222 extending forwardly from the subcarriage 54 shown in Figures 6 and 4. The drum has a pinion gear 223 secured thereto which meshes with a rack 224 that is mounted on the lower housing section parallel with the direction of travel of the subcarriage. At the right end of the machine there is another drum 225 journaled on a fixed horizontal pivot 226 secured to the flange 114b of the bracket plate 114. A cord 227 is secured to and trained about each of these drums and led from the top edge of one drum to the other, and is under constant tension by a torsion spring 228 acting on the drum 225. On the index carriage 210 there is a clip 229 by which the carriage is secured to the cord. As the translating devices are advanced across the record, the cord is unreeled progressively from the drum 221 and taken up by the drum 225 under influence of the torsion spring 228 to cause the index carriage 210 to be advanced rightwardly in amplified proportional relationship to the movement of the translating devices. When the translating devices are backspaced the drum 221 takes on the cord against tensioning of the torsion spring 228 to return the index carriage. An advantage of this coupling is that a user can displace the translating devices by manipulation of the index carriage only in an advancing direction, for if he should attempt to backspace the translating devices by movement of the index carriage the cord 227 will slacken between the index carriage and the drum 221 without moving the latter. This prevents accidental backspacing of the recorder onto a recorded area by accidental manipulation of the indexing keys. In order to retain the cord on the drum 221 should the cord become slack as described, a cylindrical housing 230 is formed on the subcarriage in surrounding relation to the drum except for a recess 230a where the cord leaves the drum.

A warning means to inform the user when he nears the end of a record is provided in the form of two clappers 231 and 232. These clappers are pivoted on the right end of the support rod 53 and extend forwardly below the feed screw 25 along the base of the housing as shown in Figure 11. The clappers are normally held raised in inoperative positions by a bail 233 pivoted at its ends on the support rod 53 and having a slot 233a therein engaged by extensions 234 of the clappers. The bail is held tilted to withhold the clappers in raised positions, against the force of their own biasing weight, by a pin 235 on the bracket 58 in sliding engagement with the front edge of the bail as shown in Figure 4. However, as the carriage nears the end of its travel the pin 235 engages a recess 236 in the front edge of the bail to allow the bail to tilt upwardly with consequent lowering of the clappers. As the clappers are so lowered, respective tongues 237 and 238 thereof move downwardly into engagement with respective toothed wheels 239 and 240 mounted side by side on the feed screw 25. As the feed screw rotates to drive the carriage, these wheels recurrently raise the clappers and allow them to drop by their own weight against the base of the lower housing section, acting as a sounding board, to produce a warning sound that recordation is approaching the end of the record. In order that this warning sound may be doubled in frequency for better warning effect, the two toothed wheels are positioned out of phase by half the distance between successive teeth.

The present machine is preferably provided with an electric signaling and control system such as is specifically shown in the pending Dietz application Serial No. 320,025 abovementioned. The signaling part of this system is preferably of the character described and claimed in the pending Somers application Serial No. 301,437, filed July 29, 1952 (now Patent No. 2,770,680, dated Nov. 13, 1956). A portion of this control system represents however part of the present invention and is herein shown by the schematic diagram of Figure 16. As here shown, the motor M is supplied with power through the master switch 94 and an end switch 241 which may be of the pushbutton variety. This end switch is mounted for operation by a bar 242 adjustably secured to the subcarriage by screws 243 as shown in Figure 4. The end switch 241 is normally closed but as the subcarriage nears the end of its travel the bar 242 impinges against the pushbutton of the switch and opens the motor circuit to stop the machine. This defines definitely the end of travel of the recorder across the record. During reproducing, it is necessary to allow the carriage to travel farther across the record since the reproducer is set at a trailing distance behind the recorder as before described. To permit such additional feed of the carriage during reproducing, a shunt circuit 244 is connected across the end switch and serially includes a single-pole double-throw switch 245 controlled according to whether the machine is in recording or reproducing condition. The switch 245 is mounted on an arm 134b standing up from the bracket 134 (Figure 4) and, for example, is of the type having a central contact 246 and two opposite movable contacts 247 and 248. For moving these contacts there is a U-shaped insulating plate 249 mounted on a lug 250 turned over from the slide 144 as shown in Figure 4. This insulating plate embraces the three contacts and bears against the right contact 248 to close the same with the central contact when the machine is in recording condition. As the machine is conditioned for reproducing, the rightward movement of the slide 144 causes the left contact 247 to be moved against the central contact. As shown in Figure 16, the shunt circuit 244 includes the contacts 246 and 247 in series so as to short the end switch 241 when the machine is conditioned for reproducing. Thus the end switch is disabled to allow the carriage to progress during reproduction to the end of the recordation on the record.

The switch 245 is also instrumental in controlling a signal light 251 of the high-impedance neon type. This signal light is employed in connection with a master signal light 252, connected directly across the power supply only through the master switch 94, to inform the user as to when the machine is ready for use and whether or not it is in recording condition as described fully in the Somers application Serial No. 301,437 abovementioned. A power circuit 253 for the signal light 251 is connected in parallel with the motor M and may be completed through the contacts 246 and 248 of the switch 245 and a switch 254. The switch 254 is mounted on the right side of the bridge 39 and comprises two switch blades one of which 254a overlies an insulating collar 255 on the lift rod 88 to hold the switch open whenever the lift rod is in neutral position, this being the positioning of the lift rod whenever a record is not clamped on the turntable and/or the master switch control means is in lock-up position. Since the contacts 246 and 248 are made only when the machine is conditioned for recording, and since the switch 254 is closed only when the motor is running and a record is clamped on the turntable, the user will know when the machine is conditioned for recording by whether or not both signal lights are lit.

The embodiment of my invention herein particularly shown and described is intended to be illustrative and not limitative of my invention since the same is subject to changes and modifications without departure from the scope of my invention, which I endeavor to express according to the following claims.

I claim:

1. In a dictating machine having a support for a record: the combination of record-cooperable translating means having recording and reproducing styli engageable with a supported record: the combination of means for lifting said recording stylus from the record; electric circuits and switch means therein for completing audio circuits to said translating means for recording and reproducing selectively; a control member mounted for both rotational and translational movements; means for positioning said lifting means by said control member when the same is in one translational position thereof for placing said recorder stylus in engagement with the record; means for positioning said switch means for recording by said control member when the latter is in said one position; means operable by said control member upon turning movement thereof while in said one position for operating said switch means for reproducing; and means operable by said control member as the same is moved to a second translational position for operating said stylus-lifting means and concurrently operating said switch means for reproducing.

2. The combination set forth in claim 1 including torsional biasing means effective on said control member only when the same is in said one position; and detenting means for releasably holding said control member in said second translational position thereof.

3. The combination set forth in claim 1 including a carriage for said translating means mounted for traveling movement; and means rendered effective by said control member as the same is moved to said second translational position for moving said carriage by rotational movement of said control member.

4. In a dictating machine having a movably-mounted support for a record: the combination of a recorder and a reproducer each mounted for movement into and out of engagement with a record on said support and each urged towards the record, said reproducer being set for engagement with the record at a trailing distance behind said recorder; an audio circuit connectable selectively to said recorder and reproducer; a record-reproduce control member mounted for translational movement into record and reproduce positions and for rotational movement while in record position; means controlled by said control member for connecting said audio circuit to said recorder and for placing both said recorder and reproducer in engagement with the record when said control member is in record position; means operable by said control member as the same is turned in record position for shifting said audio circuit to said reproducer; and means operable by said control member as the same is shifted translationally to reproduce position for lifting said recorder from the record, leaving said reproducer on the record and concurrently shifting said audio circuit to said reproducer.

5. In a dictating machine including a rotatable support device for a record, a record-cooperable translating means selectively conditionable for recording and reproducing, a carriage device for said translating means and means mounting one of said devices for traveling movement relative to the other: the combination of drive means for said one device; an end switch biased closed and operated into open position by said one device as the same reaches its end of normal travel; a power circuit for said drive means including said end switch to cause stoppage of said drive means as said one device reaches its end of normal travel; means for selectively conditioning said translating means for recording and reproducing; and a shunt circuit across said end switch serially including a switch controlled by said conditioning means and closed only when said conditioning means is in reproduce position whereby to disable said end switch and permit advancement of said one device by said drive means past said normal end position thereof when said translating means is conditioned for reproducing.

References Cited in the file of this patent

UNITED STATES PATENTS

| | | |
|---|---|---|
| 1,139,947 | Zaiss | May 18, 1915 |
| 2,091,371 | McMaster | Aug. 31, 1937 |
| 2,184,914 | Gramann | Dec. 26, 1939 |
| 2,296,870 | Proctor | Sept. 29, 1942 |
| 2,344,646 | Shrader | Mar. 21, 1944 |
| 2,506,665 | Giovannucci | May 9, 1950 |
| 2,613,939 | Moore | Oct. 14, 1952 |
| 2,738,194 | Foster | Mar. 13, 1956 |